(12) United States Patent
Levy et al.

(10) Patent No.: US 12,267,336 B2
(45) Date of Patent: Apr. 1, 2025

(54) DYNAMIC MULTI-NETWORK SECURITY CONTROLS

(71) Applicant: AT&T Intellectual Property I, L.P., Atlanta, GA (US)

(72) Inventors: Donald Levy, Holmdel, NJ (US); Jason Godfrey, Volcano, CA (US); Robert Kong, Tinton Falls, NJ (US); Deon Ogle, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 441 days.

(21) Appl. No.: 17/365,448

(22) Filed: Jul. 1, 2021

(65) Prior Publication Data
US 2023/0007018 A1    Jan. 5, 2023

(51) Int. Cl.
*H04L 29/06* (2006.01)
*H04L 9/40* (2022.01)

(52) U.S. Cl.
CPC ...... *H04L 63/1416* (2013.01); *H04L 63/0236* (2013.01); *H04L 63/0876* (2013.01); *H04L 63/1425* (2013.01); *H04L 63/145* (2013.01); *H04L 63/20* (2013.01)

(58) Field of Classification Search
CPC . H04L 63/1425; H04L 63/20; H04L 63/0236; H04L 63/0876
See application file for complete search history.

(56) References Cited

U.S. PATENT DOCUMENTS

| | | | |
|---|---|---|---|
| 11,968,226 B1* | 4/2024 | Chychi | H04L 45/22 |
| 2003/0014665 A1* | 1/2003 | Anderson | H04L 63/1458 726/4 |
| 2005/0144467 A1* | 6/2005 | Yamazaki | H04L 63/104 713/189 |
| 2007/0250930 A1* | 10/2007 | Aziz | H04L 63/145 726/24 |
| 2016/0308833 A1* | 10/2016 | Yu | H04L 63/0218 |
| 2020/0366689 A1* | 11/2020 | Lotia | H04L 63/1425 |

\* cited by examiner

*Primary Examiner* — Ellen Tran
(74) *Attorney, Agent, or Firm* — Guntin & Gust, PLC; Mark Wilinski

(57) ABSTRACT

Dynamic multi-network security controls are provided herein. A method can include receiving a report of malicious network traffic observed by first network equipment operating in a first communication network, where the report indicates a second communication network distinct from the first communication network as an originating network of the malicious network traffic, identifying second network equipment operating in the second communication network as a source of the malicious network traffic, and based on the identifying, blocking communications from the second network equipment for a defined time interval.

20 Claims, 12 Drawing Sheets

400

DYNAMIC ACCESS CONTROL LIST 310

| Address | Expiration |
|---------|------------|
| x.y.z.1 | 07-21-2022 14:45 UTC |
| x.y.z.3 | 07-21-2022 14:50 UTC |
| a.b.c.7 | 07-21-2022 16:05 UTC |
| a.b.c.46 | 07-22-2022 12:15 UTC |
| ⋮ | ⋮ |

FIG. 4

DYNAMIC MULTI-NETWORK SECURITY CONTROLS

TECHNICAL FIELD

The present disclosure relates to communication networks, and, in particular, to techniques for implementing security controls in communication networks.

BACKGROUND

In a communication network environment, it is desirable to prevent network devices from encountering malicious, harmful, or otherwise unwanted network traffic. Examples of malicious network traffic can include viruses or other malware, network-based attacks such as distributed denial of service (DDoS) attacks, or the like. Factors such as the increased adoption of encrypted transport between end devices and/or applications, as well as an increase in the use of multi-network communications, can reduce the effectiveness of conventional network security approaches.

DESCRIPTION OF DRAWINGS

FIG. 4 is a diagram depicting an example implementation of the dynamic access control list of FIG. 3 in accordance with various aspects described herein.

DETAILED DESCRIPTION

Figure 1:
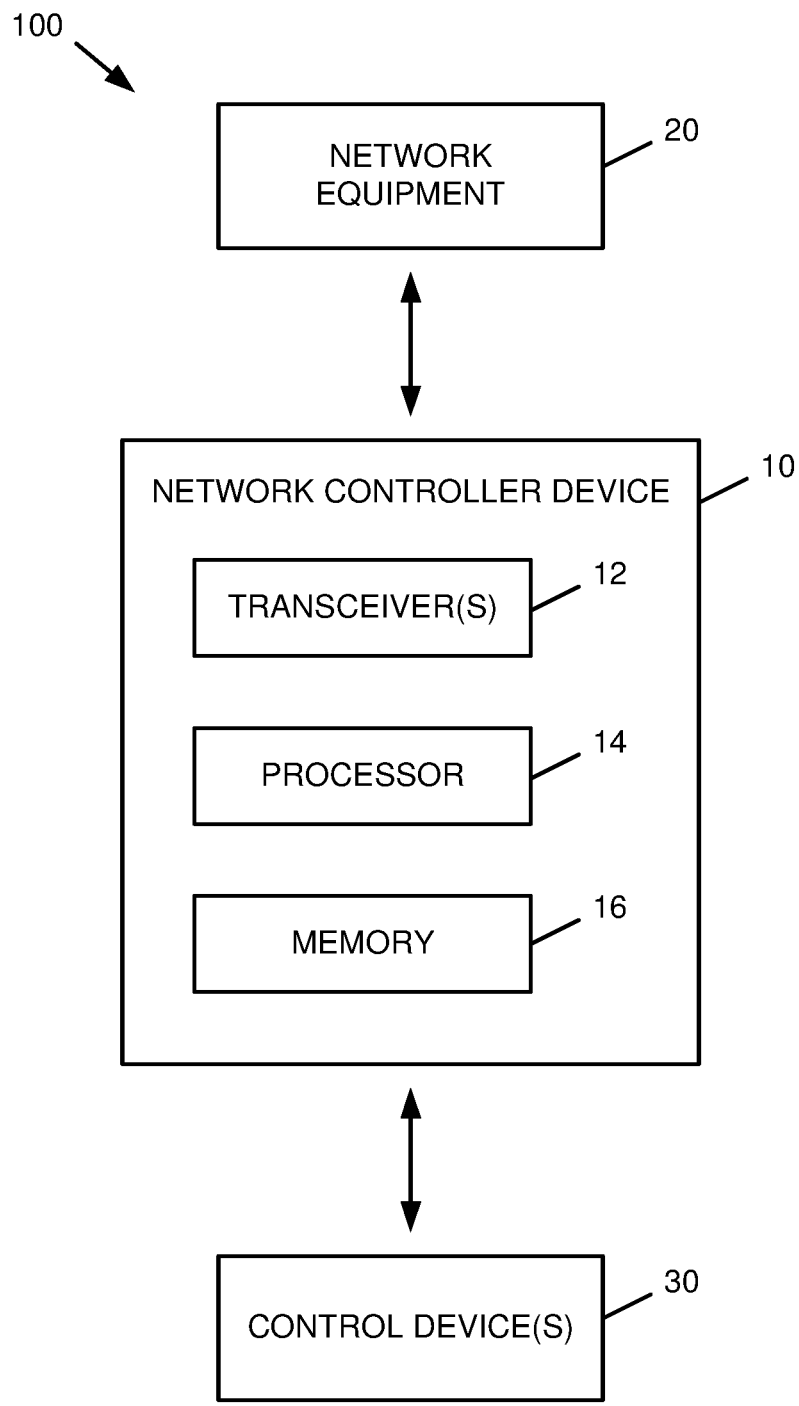
FIG. 1 is a block diagram of a system that facilitates dynamic multi-network security controls in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include receiving, by a system including a processor via an internet protocol (IP) network, a report of malicious network traffic observed by first network equipment operating in a first communication network communicatively coupled to the IP network. The report can indicate a second communication network, communicatively coupled to the IP network and distinct from the first communication network, as an originating network of the malicious network traffic. In response to receiving the report, the method can further include identifying, by the system, second network equipment operating in the second communication network as a source of the malicious network traffic. The method can additionally include causing, by the system, a control device associated with the second communication network to prevent the second network equipment from transmitting network traffic, including the malicious network traffic, outside of the second communication network via the IP network for a defined time interval.

In another aspect, a system as described herein can include a processor and a memory that stores executable instructions that, when executed by the processor, facilitate performance of operations. The operations can include receiving, via an IP network, a report of malicious network traffic observed by first network equipment operating in a first communication network communicatively coupled to the IP network, the report indicating a second communication network, communicatively coupled to the IP network and distinct from the first communication network, as an origination point of the malicious network traffic; in response to receiving the report, locating, as a source of the malicious network traffic, second network equipment operating in the second communication network; and causing a network router associated with the second communication network to block the second network equipment from transmitting network traffic, including the malicious network traffic, outside of the second communication network via the IP network for a defined time period.

In a further aspect, a non-transitory machine-readable medium as described herein can include executable instructions that, when executed by a processor, facilitate performance of operations. The operations can include receiving, via an IP network, an indication of harmful network traffic observed by a first network device operating in a first communication network communicatively coupled to the IP network, the indication specifying a second communication network, communicatively coupled to the IP network and distinct from the first communication network, as an originating network of the harmful network traffic; in response to receiving the report, identifying a second network device operating in the second communication network as a source of the harmful network traffic; and causing a network controller of the second communication network to deny access by the second network device to the IP network for a defined time interval.

Referring first to FIG. 1, a system 100 that facilitates dynamic multi-network security controls is illustrated. System 100 as shown by FIG. 1 includes a network controller device 10 that can communicate with one or more other devices such as network equipment 20, one or more control devices 30 (e.g., network routers, firewalls, etc.), and/or other devices. In an aspect, the network controller device 10 can be utilized to facilitate dynamic filtering of malicious, harmful, or otherwise unwanted network traffic within one or more networks associated with the network controller device 10. The network controller device 10 can be implemented as a standalone device that is communicatively coupled to the network equipment 20 and control devices 30 via respective networks or internetworks, or alternatively the network controller device 10 can be implemented via one or more elements of a core network environment associated with a network operator and communicate with the network equipment 20 and control devices 30 via an IP network or the like. Other implementations are also possible.

The network equipment 20 shown in system 100 can include, and/or implement the functionality of, a network controller, a base station, an access point, an Evolved Node B (eNB), a next generation Node B (gNB), user equipment devices (UE) or other mobile devices, and/or any other devices that can communicate with the network controller device 10 over one or more communication networks. In an aspect, the network equipment 20 can be configured to report and/or indicate the presence of malicious network traffic, such as that associated with malware, system intrusions, distributed denial of service (DDoS) attacks or the like, and/or other harmful or unwanted events to the network controller device 10. Also or alternatively, the network controller device 10 can be configured to monitor traffic associated with the network equipment 10 and detect malicious or undesirable network traffic present in the monitored traffic. Other implementations could also be used.

The control devices 30 shown in system 100 can include standalone devices, network routers, firewall devices, and/or other network devices that regulate the flow of network traffic between communication networks associated with the network controller device 10. For example, the control devices 30 can be provider edge (PE) router devices associated with an IP network implemented by a network service provider, e.g., as described in further detail below with respect to FIGS. 6-8, and/or any other device that can be operable to restrict and/or otherwise control the flow of network traffic between respective communication networks.

In an aspect, the network controller device 10 can include one or more transceivers 12 that can communicate with (e.g., transmit messages to and/or receive messages from) the network equipment 20, the control devices 30, and/or other devices in system 100. The transceiver 12 can include respective antennas and/or any other hardware or software components (e.g., an encoder/decoder, modulator/demodulator, etc.) that can be utilized to process signals for transmission and/or reception by the network controller device 10 and/or associated network devices such as a base station. Also or alternatively, the transceiver 12 can include an interface that facilitates communication with one or more elements of system 100, such as the control devices 30 or the like, via backhaul connections.

In an aspect, the network controller device 10 can further include a processor 14 and a memory 16, which can be utilized to facilitate various functions of the network controller device 10. For instance, the memory 16 can include a non-transitory computer readable medium that contains computer executable instructions, and the processor 14 can execute instructions stored by the memory 16. For simplicity of explanation, various actions that can be performed via the processor 14 and the memory 16 of the network controller device 10 are shown and described below with respect to various logical components. It is noted that the logical components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable. In addition, an example computer architecture that can be utilized wholly or in part to implement various logical components described herein is described in further detail with respect to FIG. 12.

In an aspect, the processor 14 and the memory 16 of the network controller device 10 can facilitate a dynamic and automated implementation of security controls across multiple networks, including networks of a same communication technology or different technologies. Additionally, the network controller device 10, via the processor 14 and memory 16, can use data from multiple types of on-network and/or off-network sources, including network endpoints, to define network access controls. By way of example, if an endpoint or network device, an antivirus/antimalware service, or other source detects or identifies anomalous traffic, this information can be provided to the network controller device 10, which in turn can initiate a request to the network to filter the identified traffic. Respective examples of sources that can be utilized by the network controller device are described in further detail below with respect to FIGS. 9-10.

Filtering and/or blocking as initiated by the network controller device 10 can occur in several places across multiple associated networks. For instance, controls can be implemented locally near a source of offending traffic and/or at a point farther away in the network that is closer to the destination for the traffic. As another example, the network controller device 10 can reach out to another network, which can operate according to the same network technology or different network technologies from a network associated with the network controller device 10, to facilitate blocking traffic as it enters or leaves the network ecosystem.

Additionally, the network controller device 10 can implement controls in a coordinated fashion across respective in-scope control devices 30 to achieve a comprehensive security solution. The implemented controls can be dynamic, e.g., such that they have a time to live, and/or static in order to reduce the proliferation of blocking rules over time. In a further aspect, dynamic and automated security controls facilitated by the network controller device 10 can extend near real-time intelligent monitoring, filtering, and/or blocking capability to untrusted premises, e.g., for private network implementations such as private 5G, 6G, or other networks.

By implementing various embodiments as described herein, various advantages can be realized that can improve the performance of a wireless communication network and/or respective devices in the network. These advantages can include, but are not limited to, the following. The ability of a communication network to identify and act upon malicious network traffic, and in particular encrypted malicious traffic, can be improved. Usage of communication network resources can be improved. Response times for malicious network traffic in a communication network can be increased, and the range of response opportunities for such traffic can be increased. Other advantages are also enabled by such network access.

Figure 2:
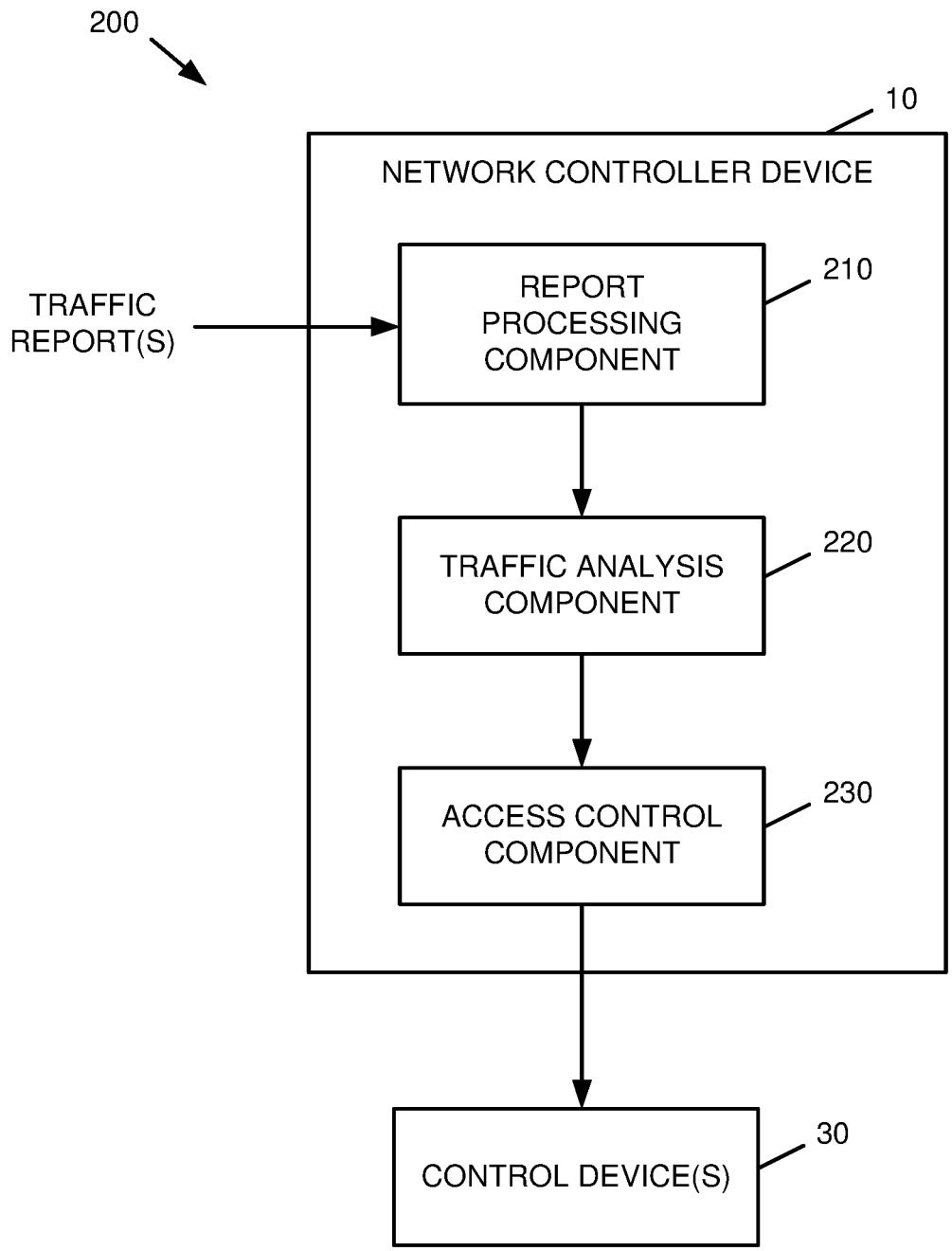
FIG. 2 is a block diagram that depicts example functionality of the network controller device of FIG. 1 in accordance with various aspects described herein.

With reference now to FIG. 2, a block diagram of a system 200 that facilitates dynamic multi-network security controls is illustrated. Repetitive description of like elements employed in other embodiments described herein is omitted for brevity. System 200 as shown in FIG. 2 includes a network controller device 10 that can operate in a similar manner to that described above with respect to FIG. 1. As shown in FIG. 2, the network controller device 10 of system 200 can include a report processing component that can receive, e.g., over an IP network, a provider network, a core network, etc., a report of malicious and/or harmful network traffic observed by network equipment, e.g., network equipment 20 as shown in FIG. 1, that operates in a first communication network that is communicatively coupled to the IP network.

In an aspect, the communication network in which the network equipment observing the malicious network traffic operates can utilize a same radio access technology, or different radio access technologies, than the network controller device 10 and/or a network in which the network controller device 10 operates. Respective examples of an internetwork environment in which the network controller device 10 and respective network equipment can operate are described in further detail below with respect to FIGS. 5-6. Also or alternatively, while reports provided to the report processing component 210 can relate to network traffic observed by a network equipment, the report itself can be provided to the network controller device 10 via the network equipment that observed the traffic and/or other equipment or network entities acting on the network equipment's behalf.

In an aspect, the report provided to the report processing component 210 as described above can indicate a second communication network, which is also communicatively coupled to the IP network and is distinct from the first communication network, as an originating network or origination point of the malicious network traffic. Depending on information available to the entity that provides the report to the report processing component 210, the report can indicate one or more specific devices in the second communication network as source devices of the malicious traffic, or alternatively the report can indicate one or more networks associated with the malicious traffic, e.g., based on radio access technologies associated with the networks and/or the malicious traffic.

The network controller device 10 shown in system 200 further includes a traffic analysis component 220 that, in response to a report being received at the report processing component 210, can identify second network equipment operating in the second communication network as a source of the malicious network traffic. In an implementation in which reports provided to the report processing component 210 do not indicate specific devices as a source of the malicious traffic, the traffic analysis component 220 can communicate with control devices 30 and/or other devices associated with the communication network indicated in the report, and/or other communication networks, to pinpoint the source(s) of the malicious traffic.

Subsequent to this identification, and/or in an implementation in which specific devices are indicated in the report provided to the report processing component 210, the traffic analysis component 220 can further verify the malicious network traffic, e.g., by determining whether the traffic meets one or more network traffic criteria to be classified as malicious or harmful. This can be done, for instance, to prevent the network controller device 10 from issuing access controls in response to false or abusive reports.

The network controller device 10 shown in system 200 additionally includes an access control component 230 that can cause a control device 30 associated with the source network for the malicious or harmful network traffic to prevent network equipment identified and/or verified via the traffic analysis component 220 from transmitting network traffic, including the malicious or harmful network traffic, outside of the communication network in which it operates, e.g., via the IP network, for a defined time interval. Preventative measures that can be taken by the access control component 230 are described below with respect to FIG. 3.

By enabling preventative actions to be performed on the basis of malicious activity observed close to the target resource or network endpoint, the network controller device 10 can provide improved network security functionality in network environments that utilize encrypted transport (e.g., Transport Layer Security or TLS) between end devices and application resources as well as improved protection against malicious attacks that utilize the application layer of the Open Systems Interconnection (OSI) stack.

Similarly, the network controller device 10 can automatically and dynamically control and/or block malicious activity at a point close to the source of the malicious activity, e.g., at a control device 30 and/or similar devices, to prevent malicious traffic from entering the IP network and/or reaching the endpoint device or resources. Since the network controller device 10 is not constrained to a specific network or network technology, the network controller device 10 can provide the ability to block the source of malicious traffic even if the malicious traffic traverses multiple networks.

Figure 3:
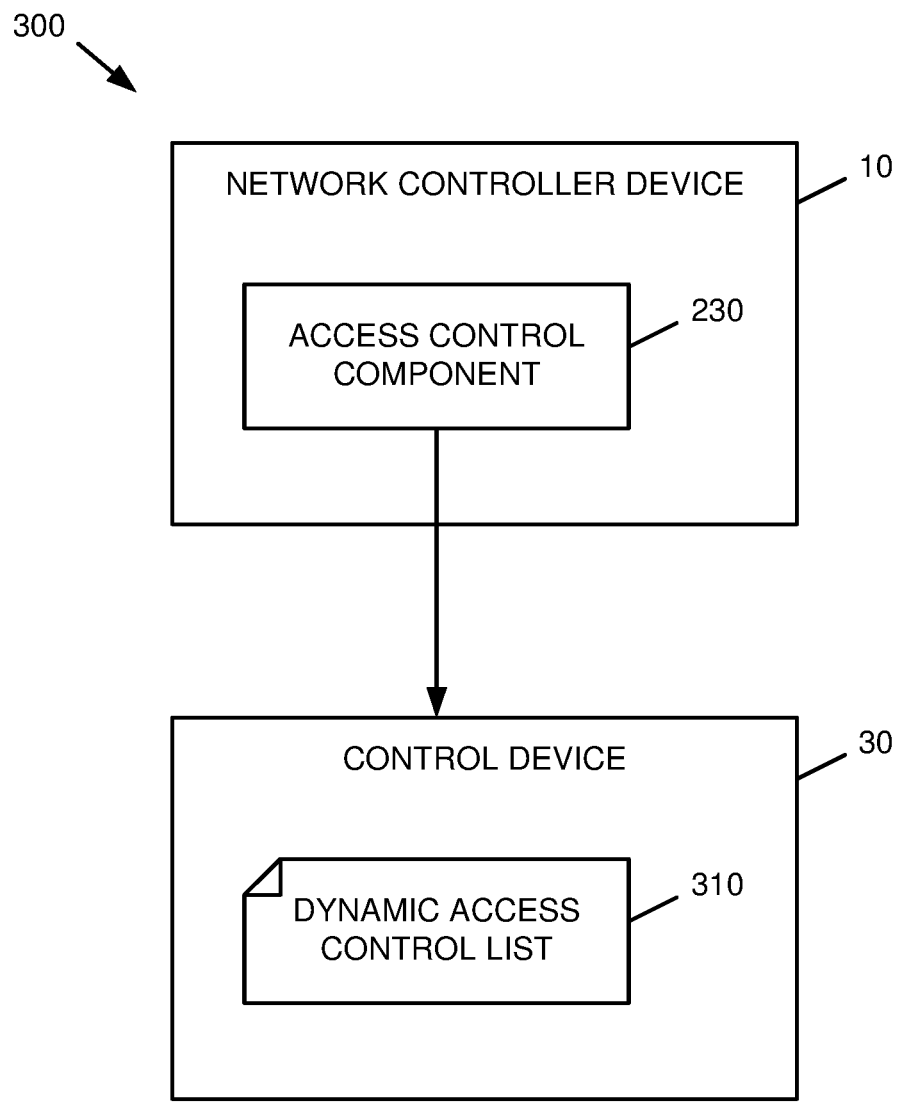
FIG. 3 is a block diagram of a system that facilitates dynamic multi-network security controls via a dynamic access control list in accordance with various aspects described herein.

Referring next to FIG. 3, a block diagram of a system 300 that facilitates dynamic multi-network security controls via a dynamic access control list (dynamic ACL) 310 is illustrated. Repetitive description of like elements employed in other embodiments described herein is omitted for brevity. As shown in FIG. 3, when the access control component 230 of the network controller device 10 identifies a source of malicious network activity, e.g., as described above with respect to FIG. 2, the access control component 230 can signal a control device 30 for a communication network associated with the source of the malicious activity to add the source device(s) to a dynamic ACL 310 maintained by the control device 30.

In an aspect, the dynamic ACL 310 can be maintained by the control device 30 in software, e.g., via a processor and memory in a similar manner to the processor 14 and memory 16 of the network controller device 10 shown in FIG. 1. Alternatively, the dynamic ACL 310 can be maintained by the control device 30 using a combination of hardware and software elements. By way of example, in the event that a control device 30 does not have sufficient processing and/or storage capabilities for maintaining a dynamic ACL 310 at a desired scale, additional storage devices, processors, and/or other hardware can be implemented at the control device 30 to facilitate maintenance of the dynamic ACL 310. As used herein, the term "shim" can refer to the software and/or hardware elements of a control device 30 that are responsible for maintaining a dynamic ACL 310. An example implementation of shims in a multi-network environment is described in further detail below with respect to FIGS. 7-8.

In another aspect, a dynamic ACL 310 maintained by a control device 30 can consist of identifiers, such as IP address or the like, of respective devices in a network associated with the control device 30, such that the network controller device 10 can cause the control device 30 to add the IP address or other identifier of identified network equipment to the dynamic ACL 310 for a defined time interval. An example implementation of a dynamic ACL 310 is shown by diagram 400 in FIG. 4. As shown in diagram 400, the dynamic ACL 310 can contain respective entries that each correspond to access controls being enforced by the control device 30. The respective entries can include an identifier for a given network device, here an IP address, and an expiration time associated with the corresponding access control. It is noted that the structure and contents of the dynamic ACL 310 shown in diagram 400 comprise merely one example of a structure that could be utilized for a dynamic ACL 310, and that other structures or contents could also be used. For instance, while the expiration time field is shown in diagram 400 as a time of day listing, the expiration field could instead track an amount of time a given access control is to remain active. Additionally, entries of the dynamic ACL 310 can specify a destination IP address in addition to a source IP address, as well as additional fields such as protocol or port number. Other modifications could also be performed without departing from the scope of this description or the claimed subject matter.

By implementing dynamic access controls with time-to-live properties, e.g., instead of a conventional blacklist, access restrictions can be better tailored to ongoing behavior of respective network devices while reducing disruptions to devices that have ceased malicious activity. For instance, at the expiration time associated with an access control on the dynamic ACL 310, the network controller device 10, e.g., via the traffic analysis component 220 described above, can determine whether the device associated with the listed IP address has discontinued transmitting malicious network traffic and/or otherwise ceased its harmful or malicious network activity. If, at that time, it is determined that the listed device has ceased performing malicious network activity, the device can be removed from the dynamic ACL 310, thereby permitting the device to again transmit network traffic outside of its associated network. In another example, devices listed on the dynamic ACL 310 can be monitored continuously or semi-continuously, such that a determination that a given device has ceased conducting malicious network activity can be made prior to the corresponding listed expiration time. In this example, the device can be removed from the dynamic ACL 310 immediately upon said determination, or alternatively the access controls can continue until their listed expiration time.

Conversely, if the network controller device 10 determines at the expiration time for a given access control on the dynamic ACL 310 that a device has not discontinued conducting malicious network activity, the entry corresponding to the device can be extended for an additional defined time period. In an aspect, extensions of an access control applied in this manner can increase with each successive extension, e.g., such that an extension of an access control is enforced for a second defined time interval that is longer than the original time interval. By way of example, a first block via the dynamic ACL 310 last for five minutes, a second block can last for one hour, a third block can last for one day, etc. Other time intervals could also be used. Additionally, the time intervals used in the dynamic ACL 310 could be non-uniform intervals, e.g., as determined via a machine learning algorithm and/or by other suitable means.

As further shown in FIG. 4, respective entries of the dynamic ACL 310 can specify individual IP addresses or other device identifiers to facilitate finely granular access control. In the example shown in FIG. 4, in the event that the network controller device 10 determines that devices from a given subnet, e.g., devices having IP addresses x.y.z.1 and x.y.z.3, are engaging in harmful network activity, these devices can be placed individually in the dynamic ACL 310. This can, in turn, reduce the impact to other, non-malicious devices that would occur for a generalized block, e.g., a block of all addresses satisfying x.y.z.*, a block of all devices associated with a given network or network operator, etc. As noted above, a control device 30 can be provided with additional processing and/or storage functionality to accommodate access control lists tailored to individual devices, e.g., instead of subnets or larger blocks of devices.

Figure 5:
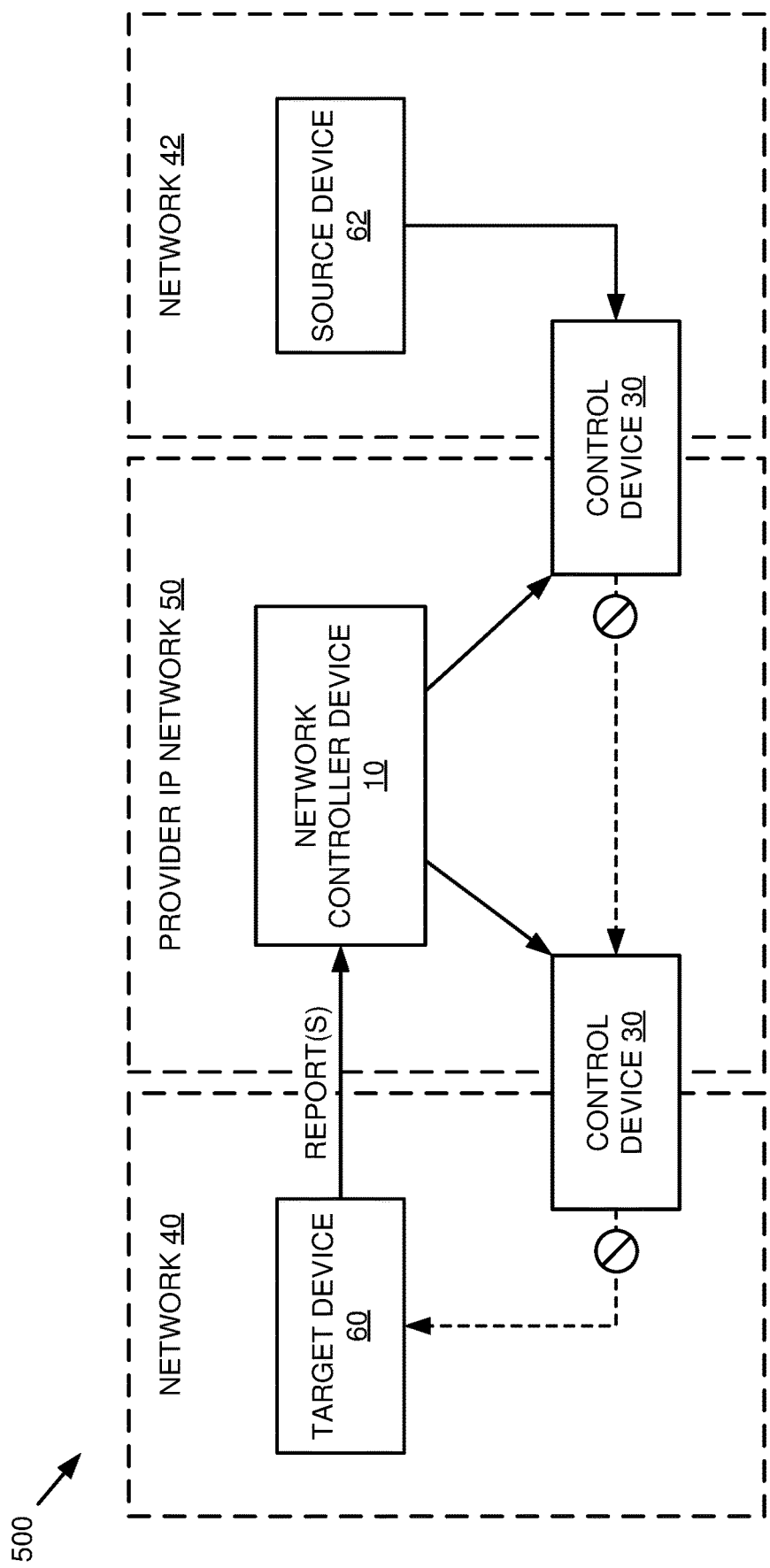
FIG. 5 is a block diagram of a system that facilitates dynamic security controls between respective networks communicatively coupled to an internet protocol (IP) network in accordance with various aspects described herein.

Referring now to FIG. 5, a block diagram of a system 500 that facilitates dynamic security controls between respective networks 40, 42 communicatively coupled to a provider IP network 50 is illustrated. Repetitive description of like elements employed in other embodiments described herein is omitted for brevity. In the example illustrated by FIG. 5, a target device 60 associated with a first network 40 has encountered malicious network traffic sent by a source device 62 associated with a second, different network 42. As further shown by FIG. 5, the networks 40, 42 are communicatively coupled to the provider IP network 50 via respective control devices 30 that route network traffic through their respectively associated networks 40, 42 and the provider IP network 50.

While the network controller device 10 is illustrated as operating in the provider IP network 50, it is noted that the network controller device 10 could also operate in one or more communication networks, which can be the same as or different from networks 40, 42. In such an implementation, the network controller device 10 could also communicate via the provider IP network 50 from a communication network associated with the network controller device 10 in a similar manner as that shown for the target device 60 and the source device 62.

As further shown in FIG. 5, the target device 60 can submit a report or other indication of the malicious network traffic transmitted by the source device 62 to the network controller device 10, which is associated with the provider IP network 50. While, for simplicity of illustration, the reporting is illustrated in FIG. 5 as proceeding directly from the target device 60 to the network controller device 10, it is noted that this reporting could be provided to the network controller device 10 in any suitable manner. For example, a report sent by the target device 60 could initially be provided to the control device 30 for network 40, which in turn can forward the report to the network controller device 10. Alternatively, a report of malicious network activity observed by the target device 60 could be provided to the network controller device 10 by a different device, not shown in FIG. 5, that communicates with the target device 60 either within the network 40 or the provider IP network 50. As still another alternative, the network controller device 10 could independently monitor traffic associated with networks 40, 42 and impose access controls upon identifying malicious network activity, even in the absence of a report provided to the network controller device 10.

In response to the network controller device 10 being made aware of malicious network activity originating from the source device 62, the network controller device can cause the control device 30 for the network 42 associated with the source device 62 to block or otherwise deny access by the source device 62 to the provider IP network 50, e.g., by adding the device to a dynamic ACL 310 as described above. In addition, the network controller device 10 can cause the control device for the network 40 associated with the target device 60 to also add the source device 62 to its dynamic ACL 310, thereby preventing network traffic originating from the source device 62 from reaching the network 40 associated with the target device 60 from the provider IP network 50. In an aspect, the control device(s) that are configured by the network controller device 10 to block the source device 62 can be determined based on the severity of the malicious network activity, the likelihood that offending network traffic can be contained via a single point in the network, and/or other considerations.

Figure 6:
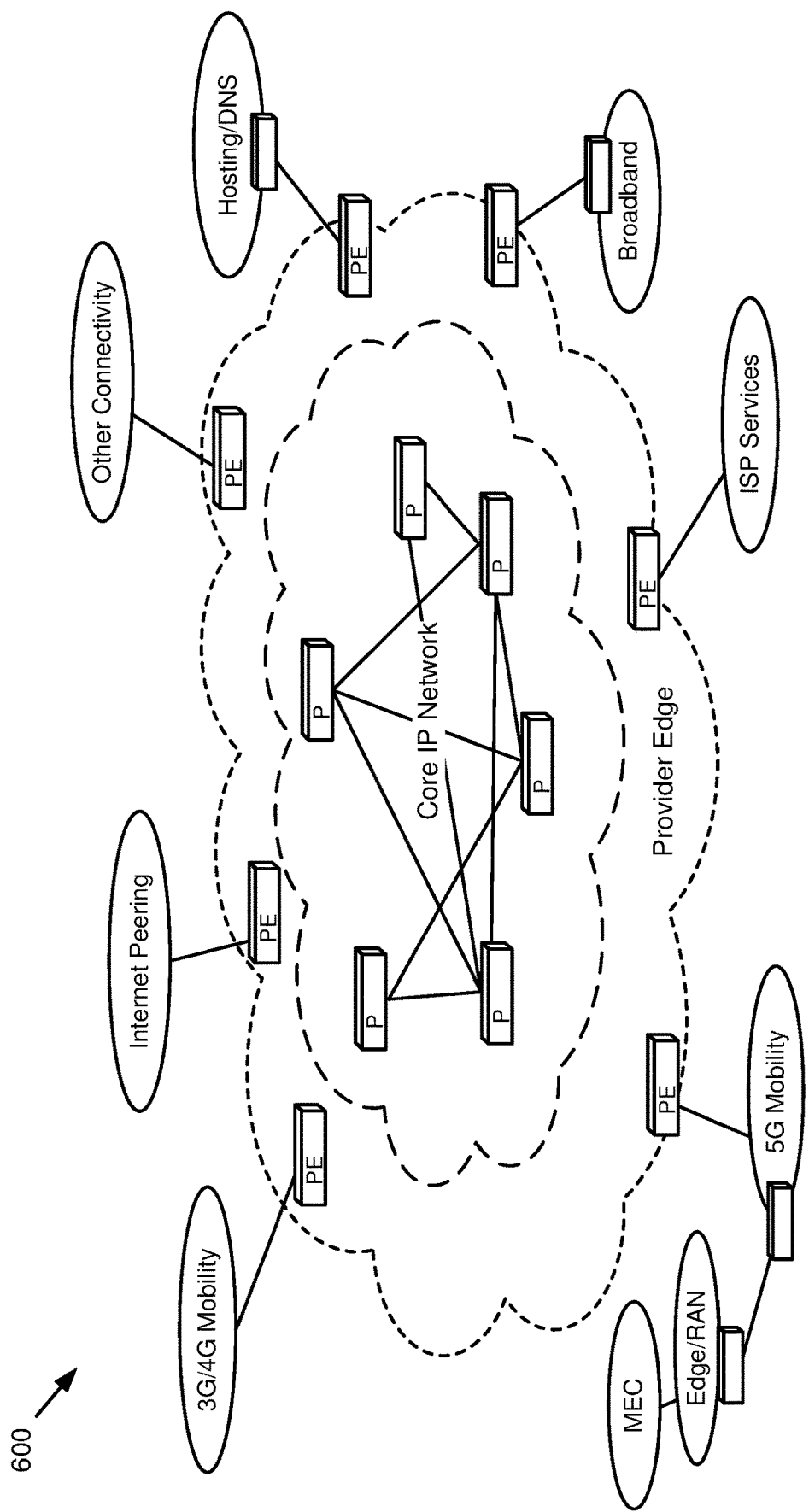
FIG. 6 is a diagram depicting an example network environment in which the network controller device of FIG. 1 can function in accordance with various aspects described herein.

Turning now to FIG. 6, diagram 600 depicts an example network environment in which a network controller device as described herein (e.g., a network controller device 10 as shown in FIG. 5) can function. Repetitive description of like elements employed in other embodiments described herein is omitted for brevity. As shown in diagram 600, the example network environment includes a core IP network that provides control and management functionality for respective networks that are communicatively coupled to the core IP network. Additionally, the core IP network, via respective provider (P) router devices, can facilitate the transferal of data between respective networks associated with the core IP network.

The core IP network, in turn, interfaces with respective communicatively coupled networks via respective provider edge (PE) router devices at the edge of the core IP network. In an aspect, the PE router devices can each be associated with one or more radio access technologies and can include network router equipment that manages traffic flows between their respective associated networks and the core IP network. To facilitate communication between an origin network and a destination network that are communicatively coupled to the core IP network, the PE router associated with the origin network can obtain network traffic to be transmitted and provide that network traffic to a P router in the core IP network, which can in turn convey the network traffic to the PE router for the destination network, either directly or indirectly, e.g., by transferring the network traffic to a second, different P router in the core IP network for conveyance of the network traffic from the second P router to the PE router for the destination network.

As shown in diagram 600, the respective PE routers can provide connectivity between respective communication networks, which can operate via a same network technology or different network technologies, via the core IP network. Diagram 600 includes an example set of networks that can be utilized in this manner, including those associated with internet peering, 3G/4G mobility, 5G mobility, internet service provider (ISP) services, broadband, hosting and/or domain name system (DNS), and a generalized network for other types of connectivity not covered via the other networks. It is noted that other network types and/or technologies could also be used.

As further shown in diagram 600, one or more of the respective communication networks can include respective associated network elements. For instance, the 5G mobility network shown in diagram 600 can be associated with a 5G edge network and radio access network (RAN), which in turn can be associated with a multi-access edge compute (MEC) node. While not illustrated in diagram 600, other ones of the depicted networks could similarly be associated with respective network elements.

In an aspect, the respective networks shown in diagram 600 can enable communication between network equipment operating in the respective networks, such as end user equipment (e.g., phones or other mobile devices, computers, etc.), network access points, firewall devices, or the like. However, as noted above, individual network equipment, such as firewall devices, can in some cases lack sufficient information to determine if network traffic is malicious, e.g., due to the traffic being encrypted and/or other causes. Additionally, devices such as firewalls are limited to the network in which unwanted traffic is detected, limiting their utility for traffic that spans multiple networks. Further, firewalls generally provide small scale protection, e.g., on the order of an individual user or a small group of users, and can be impractical to scale out to an entire network due to costs, logistics, and other factors.

Figure 7:
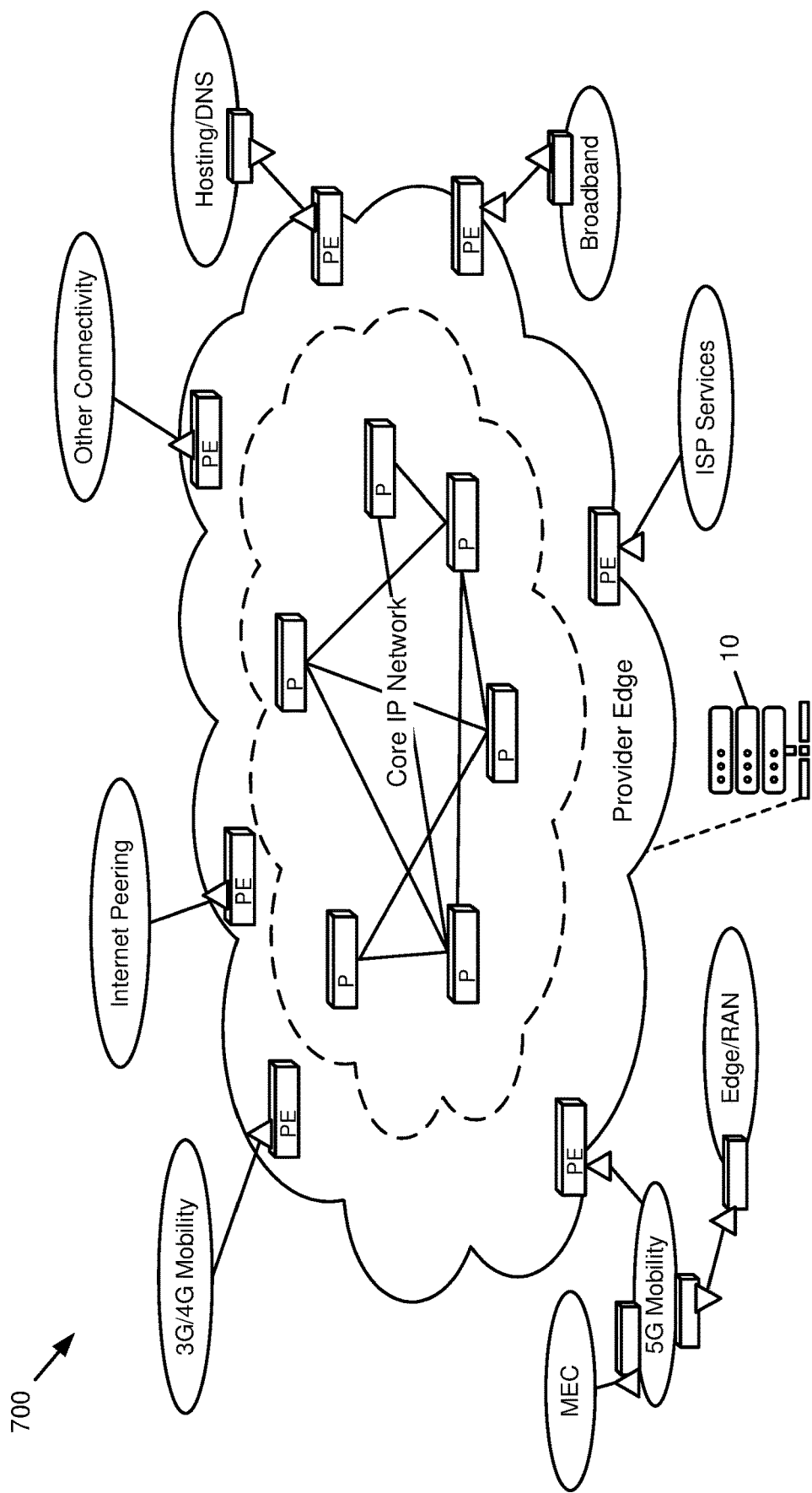
FIG. 7 is a diagram depicting monitoring and/or filtering functionality that can be implemented in the network environment of FIG. 6 in accordance with various aspects described herein.

In view of at least the above, the network controller device 10 as described herein can utilize detection sources around the network ecosystem to determine if malicious or harmful network activity is occurring, e.g., as shown by diagram 700 in FIG. 7. The triangular elements in diagram 700 represent shim elements as described above, which can include hardware and/or software that provide monitoring and/or filtering capability for the network controller device 10. As further shown in diagram 700, shim elements can be employed at respective PE routers of the provider edge network as well as at routers or other devices associated with the respective networks that are connected via the core IP network. By enabling inputs from other networks, endpoint devices, and/or users, the network controller device 10 can collect sufficient information to block traffic, even in cases in which the network said traffic resides does not have the ability to determine that the traffic is malicious. In this manner, the network controller device 10, via the shim elements shown in diagram 700, can distribute the monitoring and filtering functionality conventionally associated with a firewall device across the entire IP network.

In an aspect, the network controller device 10 can detect unwanted traffic by monitoring devices around the ecosystem. When suspicious traffic is encountered, the network controller device 10 can analyze inputs from around the ecosystem to determine whether the suspicious traffic meets defined criteria to be considered malicious. In response to traffic meeting the criteria to be considered malicious, the network controller device can implement dynamic controls, e.g., as described above with respect to FIGS. 3-4. Further, the network controller device 10 can define optimum locations for the controls, as well as the parameters for the controls, based on the types of traffic expected over the interface.

In another aspect, the network controller device 10 can have the intelligence to assemble and analyze information and determine how to distribute controls across the ecosystem to filter traffic when warranted. For instance, the network controller device 10 can send a command to a shim element located in the control device(s) where filter(s) are to be applied. Since a control device can utilize shim software, existing interfacing devices, or other devices with filtering capabilities, can be used. These devices can additionally be located around the ecosystem, thus simplifying deployment. Additionally, due to the volume of data handled by a control device such as a PE router in comparison to a conventional firewall, access controls can be deployed by the network controller device 10 as described herein on a significantly larger scale, e.g., on the order of hundreds of megabits per second per PE router.

Figure 8:
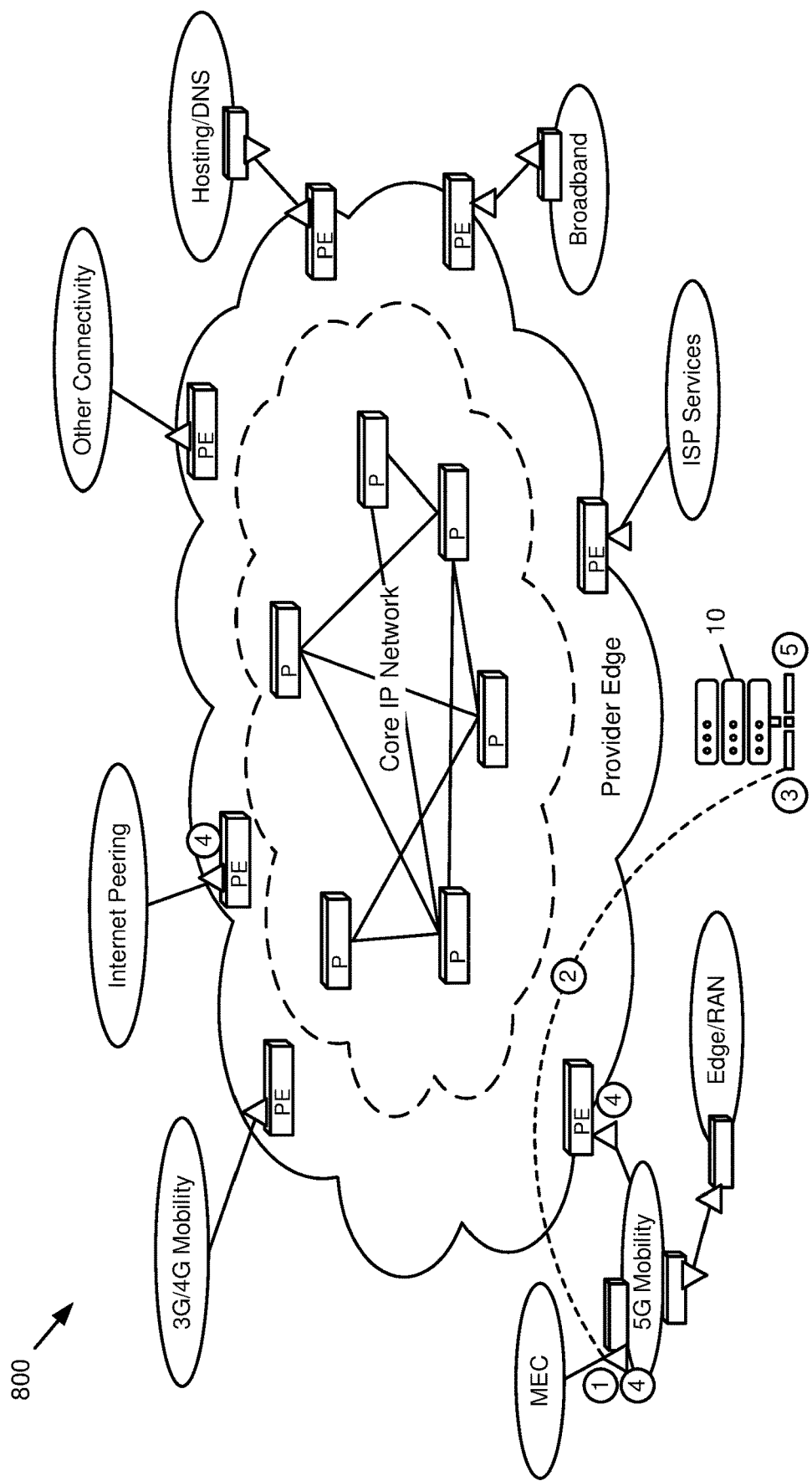
FIG. 8 is a diagram depicting example operations that can be performed by the network controller device of FIG. 1 in the network environment of FIG. 6 in accordance with various aspects described herein.

Turning next to diagram 800 in FIG. 8, a specific, non-limiting example of an event that can be handled by the network controller device 10 and other devices in a network ecosystem is illustrated. More particularly, diagram 800 illustrates a series of five steps that can be performed at respective areas of the ecosystem via circular indicators on diagram 800. It is noted, however, that other processing steps, as well as other processes entirely, could be used in addition to, or in place of, the indicated processing steps.

Initially, a monitoring device connected to a MEC within a private 5G network located on untrusted premises can detect a distributed attack, such as a DDoS attack, aimed at the MEC. Next, as shown at step 2, the monitoring device can communicate information relating to the unwanted traffic to the network controller device 10.

In response to the reporting from the MEC monitoring device, the network controller device 10, based on the inputs from the MEC monitoring device and other sources around the IP network, can determine that filters to block the unwanted traffic are to be implemented, as shown at step 3. In an aspect, a determination as to where to deploy filters can be based on the amount of unwanted traffic from each source of the traffic. For instance, depending on the type of attack, an attack could in some cases be effectively thwarted without blocking all of the traffic. Additionally, locations for filter deployment can be selected based on the availability or ability of devices in the ecosystem to deploy the desired filter(s).

As a result of analyzing the above criteria, the network controller device 10 shown in diagram 800 can determine that blocking is to be implemented at the PE device connected to internet peering, at the control device between the core IP network and the 5G mobility network, and the interface between the 5G mobility network and the MEC, as shown at step 4. These locations can be selected by the network controller device 10 based on, e.g., the amount of unwanted traffic originating from respective sources in the ecosystem, individualized considerations regarding network security (e.g., blocking can be deployed between the 5G mobility network and the MEC to avoid overloading the MEC, etc.), and/or other factors.

In order to reduce the proliferation of controls deployed around the ecosystem, the network controller device 10 as shown at step 5 can implement the controls described with respect to at step 4 for a set period of time based on, e.g., knowledge of previous network traffic patterns, machine learning, and/or other factors. Alternatively, the network controller device 10 can configure the controls to be removed once the attack traffic has subsided, and/or upon the fulfillment of any other suitable conditions.

By implementing controls as described above, the network controller device 10 can enable controls to be implemented near the source of offending traffic, resulting in reduced impact to the capacity of the core IP network and/or the networks connected to it. Additionally, implementing controls as described above can enable filters or other controls to be implemented in a fine-grained manner with reduced impact to desired network traffic. Further, when deemed appropriate, the filters or blocks as applied above can be removed, which can in turn reduce the proliferation of what could be transient filters.

Figure 9:
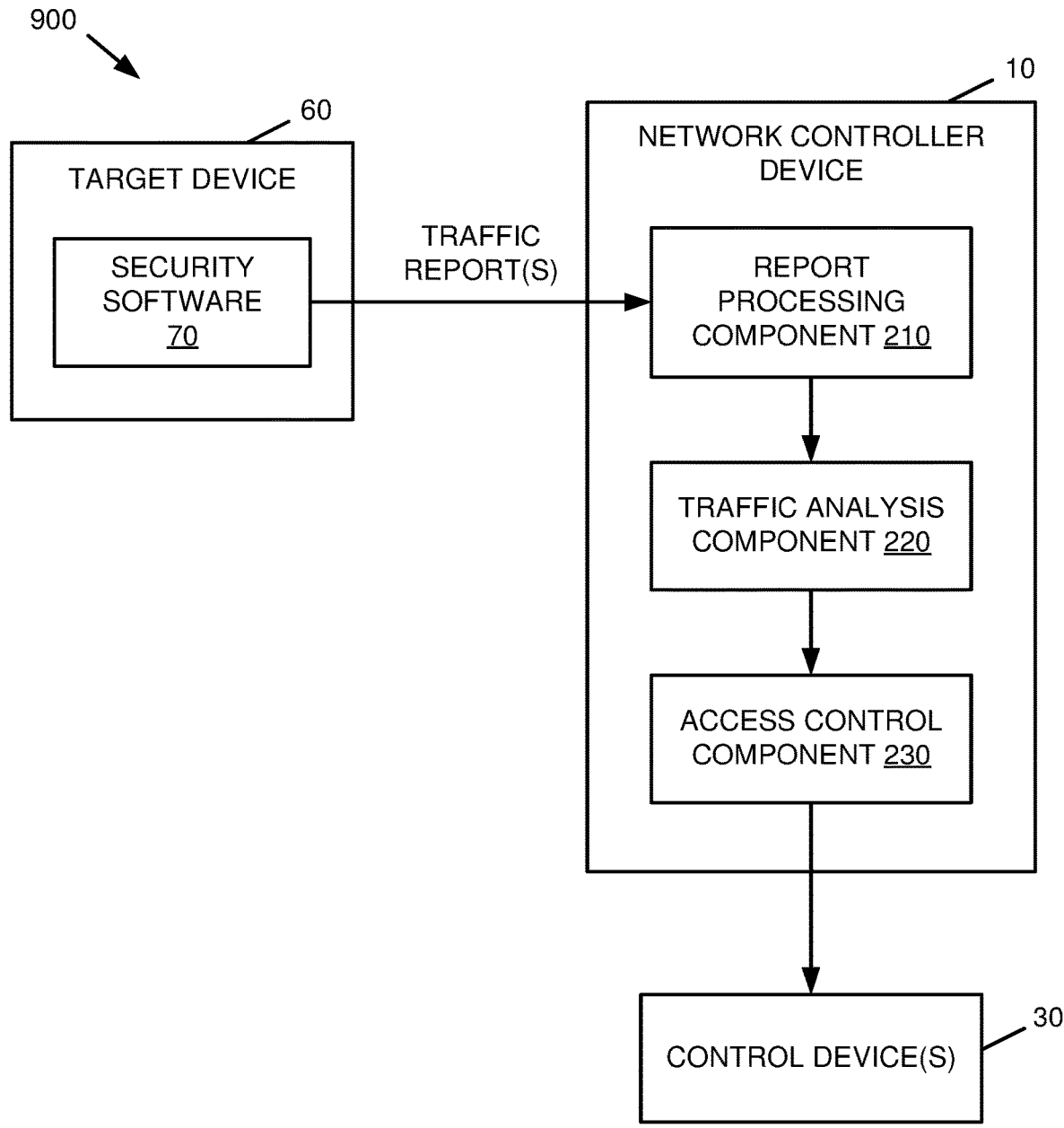
FIG. 9 is a block diagram of a system that facilitates implementation of dynamic multi-network security controls based on reporting from security software in accordance with various aspects described herein.

Turning next to FIG. 9, a block diagram of a system 900 that facilitates implementation of dynamic multi-network security controls based on reporting from security software is illustrated. Repetitive description of like elements employed in other embodiments described herein is omitted for brevity. As noted with respect to FIG. 7 above, the network controller device 10 can detect malicious network activity by monitoring devices around the network ecosystem. As shown in system 900, example sources of information that can be monitored by the network controller device 10 can include security software 70 operating on a target device 60, such as malware detection software (e.g., antivirus software, etc.), software associated with an intrusion detection system and/or other software for detecting unwanted traffic at the target device 60 and/or in a network associated with the target device 60. Also or alternatively, the network controller device 10 can obtain reports or other input in the form of a report from a router detecting an overload condition, input from a security operations center, and/or other sources. In an aspect, the security software 70, and/or other sources that can report to the network controller device 10, can utilize a defined application programming interface (API) and/or other interface(s) to send messages to the network controller device 10.

The security software 70 shown in system 900 can be specialized software designed for communication with the network controller device 10, or alternatively the security software 70 can be implemented via an extension of existing software. For instance, antivirus software operating at the target device 60 could be modified to forward information regarding a source of malware encountered by the target device 60 to the network controller device 10, e.g., in addition to blocking the malware locally at the target device 60, to facilitate network-wide controls via the network controller device 10 in addition to local controls implemented via the antivirus software.

Figure 10:
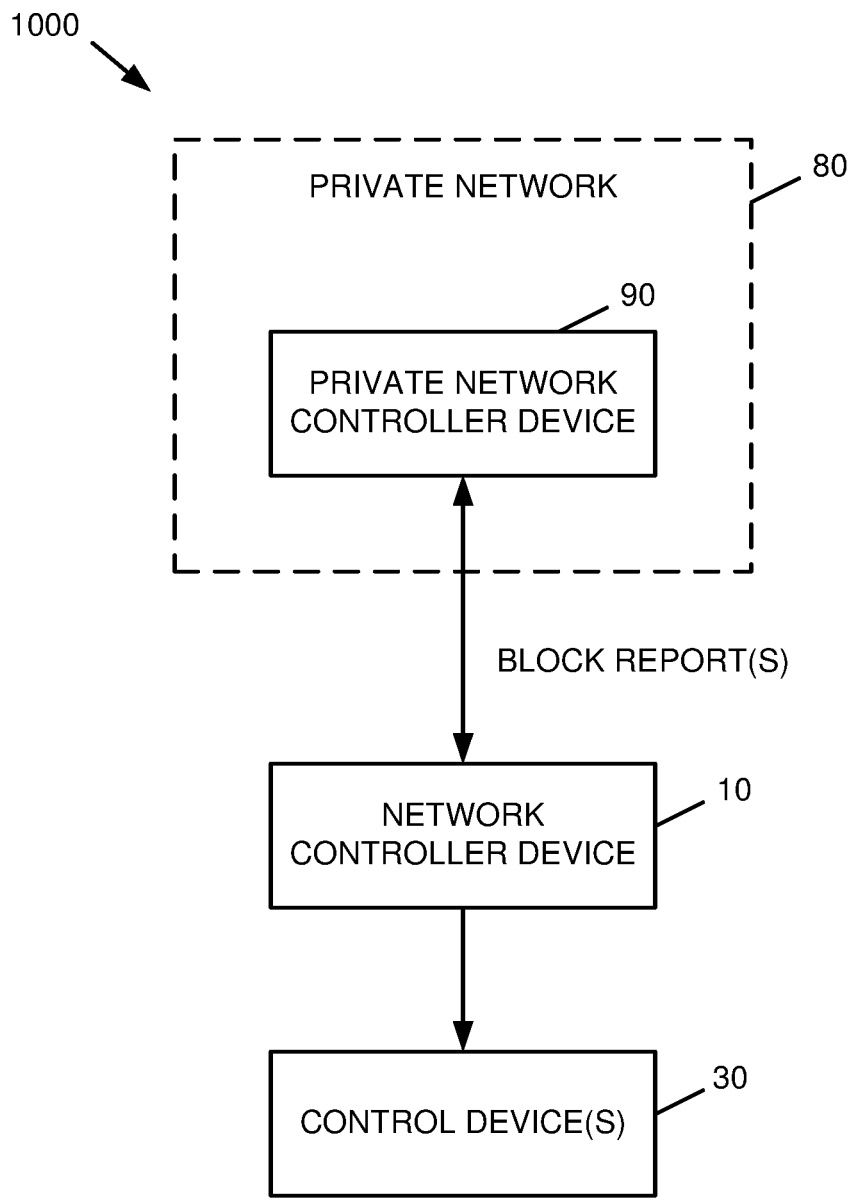
FIG. 10 is a block diagram of a system that facilitates implementation of dynamic multi-network security controls based on reporting from a private communication network in accordance with various aspects described herein.

Referring now to FIG. 10, a block diagram of a system 1000 that facilitates implementation of dynamic multi-network security controls based on reporting from a private communication network is illustrated. Repetitive description of like elements employed in other embodiments described herein is omitted for brevity. As shown in FIG. 10, system 1000 can include a private network 80, which as used herein refers to a communication network associated with a communication technology (e.g., 5G) and installed on premises that are untrusted relative to the IP network associated with the network controller device 10.

In an aspect, the private network 80 can include its own network equipment, such as cell sites, a network core, and other elements, which can be either owned by the operator of the private network 80 or provided to the operator of the private network 80 as a service. The private network 80 can also facilitate communication to and from a provider IP network, e.g., an IP network associated with the network controller device 10. In an implementation in which the private network 80 is a 5G network, the RAN section of the private 5G network (e.g., via a gNodeB or the like) can connect back to a provider 5G network via a MEC and/or cellular backhaul.

As further shown in system 1000, the private network 80 can utilize a private network controller device 90, which can provide security functionality for the private network 80 in a similar manner to that provided to the provider network via the network controller device 10. Similar to other network equipment associated with the private network 80, a private network controller device 90 could be owned and controlled by the operator of the private network 80 and/or provided to the operator as a service, e.g., by a network service provider.

In an aspect, the private network controller device 90 can implement its own blocks or filters within the private network 80, e.g., based on reports of malicious network traffic provided to the private network controller device 90 by other network equipment of the private network 80 and/or other sources. The private network controller device 90 can then provide information relating to the malicious network traffic and/or corresponding actions taken within the private network 80 back to the network controller device 10. The network controller device 10 can, in turn, verify the information provided by the private network controller device 90 to ensure its accuracy and that the reported traffic meets the criteria to be classified as malicious within the provider network. In response to successful verification of the reported data, the network controller device 10 can implement corresponding access controls via the provider network if warranted (e.g., due to the malicious network traffic originating from the provider network).

Additionally, the network controller device 10 can monitor the private network 80 in order to dynamically and automatically detect and filter and/or block malicious traffic originating from the private network 80 before it can reach the provider network. For instance, in an implementation in which the private network 80 is a private 5G network that is connected to a provider 5G network, the network controller device 10 can monitor the private network 80 to ensure that malicious traffic does not reach the provider 5G network from the private network 80.

Figure 11:
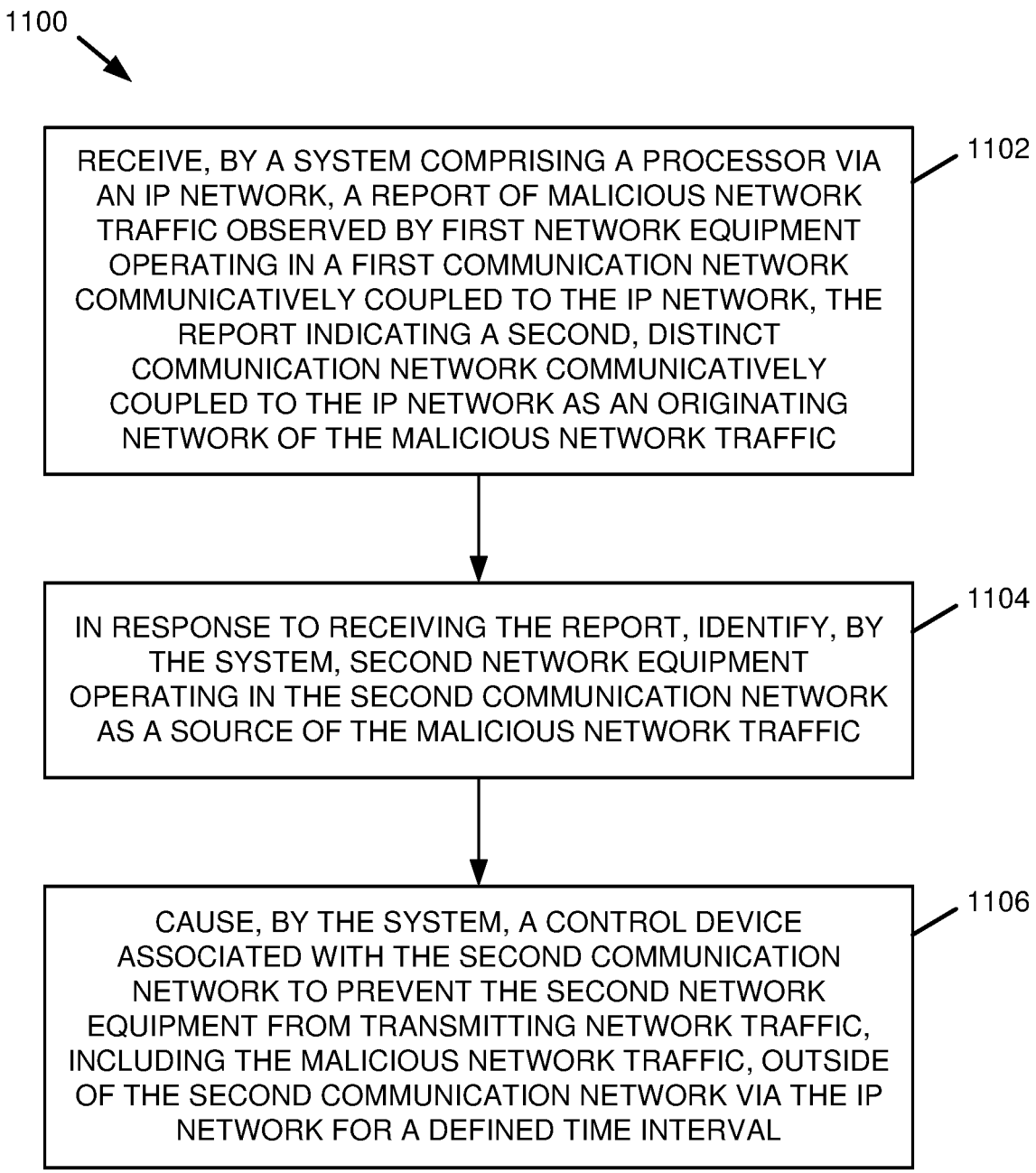
FIG. 11 is a flow diagram of a method that dynamic multi-network security controls in accordance with various aspects described herein.

FIG. 11 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 11, a flow diagram of a method 1100 that facilitates multi-network security controls is presented. At 1102, a system comprising a processor (e.g., a network controller device 10 comprising a processor 14, and/or a system including such a device) can receive (e.g., by a report processing component 210 and/or other components implemented by the processor 14), via an IP network (e.g., a provider IP network 50), a report of malicious network traffic observed by first network equipment (e.g., a target device 60) operating in a first communication network (e.g., a network 40) communicatively coupled to the IP network. In an aspect, the report indicates a second, distinct communication network (e.g., a network 42) communicatively coupled to the IP network as an originating network of the malicious network traffic.

At 1104, in response to receiving the report at 1102, the system can identify (e.g., by a traffic analysis component 220 and/or other components implemented by the processor 14) second network equipment (e.g., a source device 62) operating in the second communication network as a source of the malicious network traffic.

At 1106, the system can cause (e.g., by an access control component 230 and/or other components implemented by the processor 14) a control device (e.g., a control device 30) associated with the second communication network to prevent the second network equipment identified at 1104 from transmitting network traffic, including the malicious network traffic, outside of the second communication network via the IP network for a defined time interval.

Figure 12:
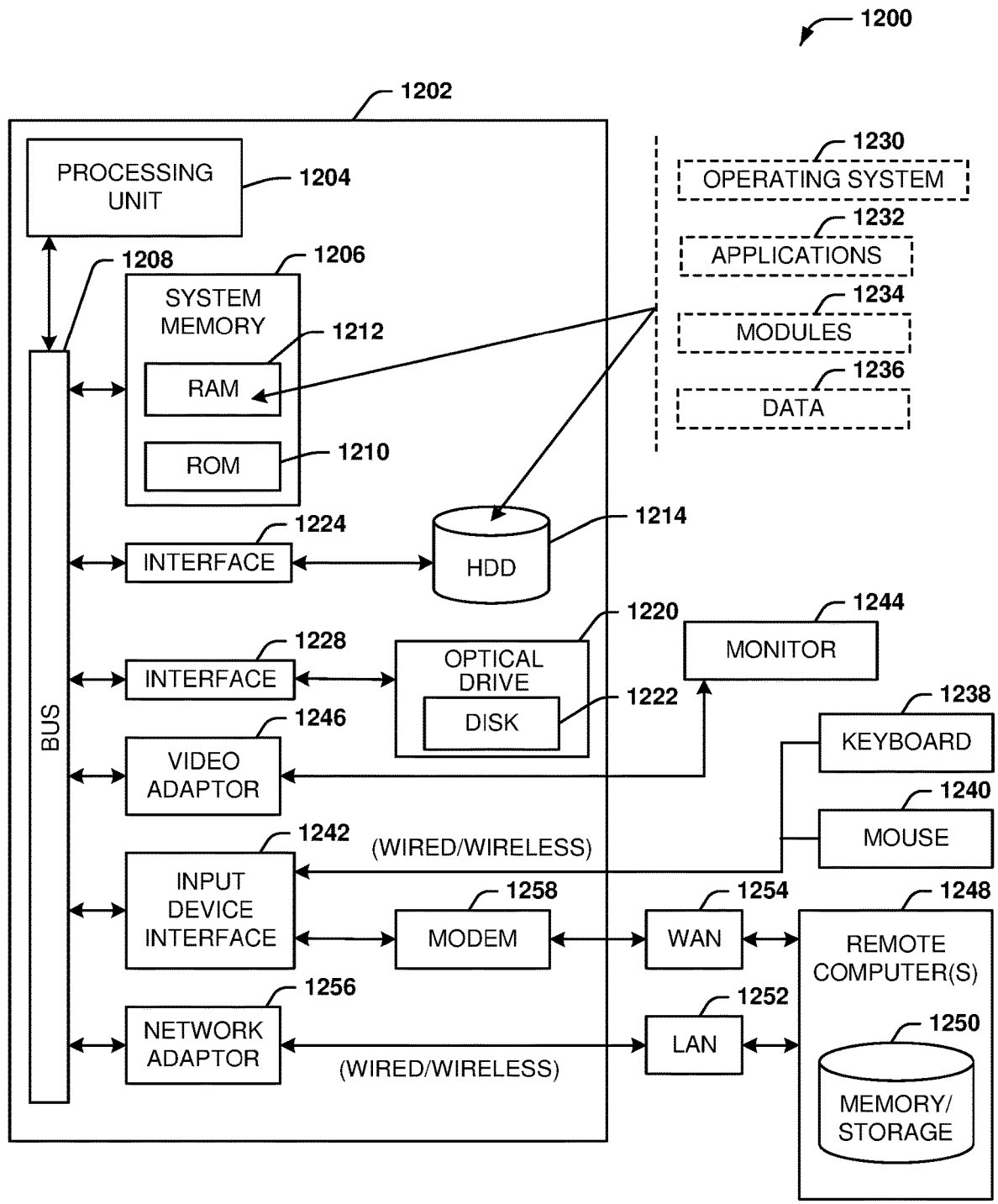
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer

1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 and an optical disk drive 1220, (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214 and optical disk drive 1220 can be connected to the system bus 1208 by an HDD interface 1224 and an optical drive interface 1228, respectively. The HDD interface 1224 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving a report of malicious network traffic observed by first network equipment operating in a first communication network, wherein the report indicates a second communication network distinct from the first communication network as an originating network of the malicious network traffic;
   in response to the receiving of the report, identifying second network equipment operating in the second communication network as a source of the malicious network traffic;
   based on the identifying, blocking, via a network controller device of a third communication network, first communications from the second network equipment from reaching the first communication network via a first link directly coupling the first communication network and the second communication network for a first defined time interval, wherein the third communication network is distinct from each of the first communication network and the second communication network;
   based on the identifying, blocking, via the network controller device of the third communication network, second communications from the second network equipment from reaching the third communication network for the first defined time interval; and
   in response to determining that the malicious network traffic from the second network equipment has not discontinued at an expiration of the first defined time interval, blocking the second network equipment from transmitting network traffic outside of the second communication network for a second defined time interval, wherein a duration of the second defined time interval as measured from the expiration of the first defined time interval is longer than a duration of the first defined time interval.

2. The method of claim 1, further comprising:
   in further response to the receiving of the report, verifying the malicious network traffic, wherein the blocking of the first communications is based on the verifying.

3. The method of claim 1, wherein the blocking of the first communications from the second network equipment from reaching the first communication network for the first defined time interval is based on an addition of an internet protocol address of the second network equipment to an access control list.

4. The method of claim 1, further comprising:
   in response to an expiration of the second defined time interval, determining that the malicious network traffic from the second network equipment has discontinued; and
   in response to determining that the malicious network traffic from the second network equipment has discontinued, permitting the second network equipment to transmit network traffic outside of the second communication network.

5. The method of claim 1, wherein the receiving of the report of the malicious network traffic comprises receiving the report of the malicious network traffic from software executing on the first network equipment, the software being selected from a group of software comprising anti-malware software and intrusion detection software.

6. The method of claim 1, wherein the receiving of the report comprises receiving a first report from a security controller device associated with the first communication network, and wherein the first report is generated based on a second report of the malicious network traffic provided to the security controller device by the first network equipment.

7. The method of claim 1, wherein the blocking of the first communications from the second network equipment from reaching the first communication network for the first defined time interval comprises controlling a network router equipment that manages network traffic flows involving the second communication network.

8. The method of claim 3, wherein an internet protocol address of a third network equipment operating in the second communication network is included in the access control list, and wherein the second network equipment and the third network equipment are included as part of a common subnet.

9. The method of claim 8, wherein a fourth network equipment operating in the second communication network is not included in the access control list, wherein the fourth network equipment is included as part of the common subnet.

10. The method of claim 1, wherein the network controller device selects a second network controller device of the first communication network to block the first communications based on a severity of the malicious network traffic and a likelihood that the malicious network traffic can be contained in the second communication network, and wherein the first link directly couples the second network controller device of the first communication network and a third network controller device of the second communication network without traversing a router of the internet protocol network.

11. A system, comprising:
a processor configured to:
receive, via an internet protocol network, a report of malicious network traffic observed by first network equipment operating in a first communication network communicatively coupled to the internet protocol network, the report indicating a second communication network, communicatively coupled to the internet protocol network and distinct from the first communication network, as an origination point of the malicious network traffic;
based on report, locate, as a source of the malicious network traffic, second network equipment operating in the second communication network;
based on locating the second network equipment as the source of the malicious network traffic, block, via a network controller device of the internet protocol network, first communications from the second network equipment from reaching the first communication network via a first link that directly couples the first communication network and the second communication network for a first defined time period;
based on locating the second network equipment as the source of the malicious network traffic, block, via the network controller device of the internet protocol network, second communications from the second network equipment from reaching the internet protocol network for a second defined time period that is different from the first defined time period; and
in response to determining that the malicious network traffic from the second network equipment has not discontinued at an expiration of the first defined time period, block the second network equipment from transmitting network traffic outside of the second communication network for a third defined time period, wherein a duration of the third defined time period as measured from the expiration of the first defined time period is longer than a duration of the first defined time period.

12. The system of claim 11, wherein based on the report the processor is configured to block the first communications from the second network equipment for the first defined time period in response to verifying the malicious network traffic according to a traffic criterion.

13. The system of claim 11, wherein the processor is further configured to:
in response to an expiration of the third defined time period, determine that the second network equipment has discontinued to transmit the malicious network traffic; and
in response to determining that the second network equipment has discontinued transmitting the malicious network traffic, permit the second network equipment to transmit network traffic outside of the second communication network via the internet protocol network.

14. A non-transitory machine-readable medium, comprising executable instructions that, when executed by a processor, facilitate performance of operations, comprising:
receiving, via an internet protocol network, an indication of harmful network traffic observed by a first network device operating in a first communication network communicatively coupled to the internet protocol network, the indication specifying a second communication network, communicatively coupled to the internet protocol network and distinct from the first communication network, as an originating network of the harmful network traffic;
in response to the receiving of the indication, identifying a second network device operating in the second communication network as a source of the harmful network traffic;
based on the identifying, blocking, via a network controller device of the internet protocol network, first communications from the second network device from reaching the first communication network via a first link that directly couples the first communication network and the second communication network for a first defined time interval;
based on the identifying, causing, via the network controller device of the internet protocol network, a control device of the second communication network to deny the second network device from accessing the internet protocol network for the first defined time interval; and
in response to determining that the harmful network traffic from the second network device has not discontinued at an expiration of the first defined time interval, blocking the second network device from transmitting network traffic for a second defined time interval, wherein a duration of the second defined time interval as measured from the expiration of the first defined time interval is longer than a duration of the first defined time interval.

15. The non-transitory machine-readable medium of claim 14, wherein the operations further comprise:
further in response to receiving the indication of the harmful network traffic, verifying that the harmful network traffic meets a network traffic criterion, wherein the blocking of the first communications is based on the verifying.

16. The non-transitory machine-readable medium of claim 14, wherein the operations further comprise:
- in response to an expiration of the second defined time interval, determining that transmittal of the harmful network traffic by the second network device has discontinued; and
- in response to the determining that the second network device has discontinued transmitting the harmful network traffic, re-enabling the second network device to transmit network traffic outside of the second communication network.

17. The non-transitory machine-readable medium of claim 14, wherein the receiving of the indication comprises receiving a first indication from a security device associated with the first communication network, and wherein the first indication is generated based on a second indication of the harmful network traffic provided to the security device by the first network device.

18. The non-transitory machine-readable medium of claim 14, wherein the duration of the first defined time interval corresponds to a plurality of minutes.

19. The non-transitory machine-readable medium of claim 18, wherein the duration of the second defined time interval corresponds to a plurality of hours.

20. The non-transitory machine-readable medium of claim 18, wherein the duration of the second defined time interval corresponds to a plurality of days as determined via a machine learning algorithm.

* * * * *